(No Model.)

J. CLAYTON.
ECCENTRIC.

No. 510,118.  Patented Dec. 5, 1893.

Witnesses:—
George Barry.
Th. Howard Titlas

Inventor:—
James Clayton
by attorneys
Brown & Seward

UNITED STATES PATENT OFFICE.

JAMES CLAYTON, OF BROOKLYN, NEW YORK, ASSIGNOR TO LOUISA CAROLINE CLAYTON, OF SAME PLACE.

ECCENTRIC.

SPECIFICATION forming part of Letters Patent No. 510,118, dated December 5, 1893.

Application filed June 13, 1893. Serial No. 477,415. (No model.)

*To all whom it may concern:*

Be it known that I, JAMES CLAYTON, of Brooklyn, in the county of Kings and State of New York, have invented a new and useful Improvement in Eccentrics, of which the following is a specification.

This invention relates to eccentrics in which anti-friction rollers are employed between the disk or wheel and the hoop or strap.

I will first describe the improvement with reference to the accompanying drawings and afterward point out its novelty in a claim.

Figure 1:
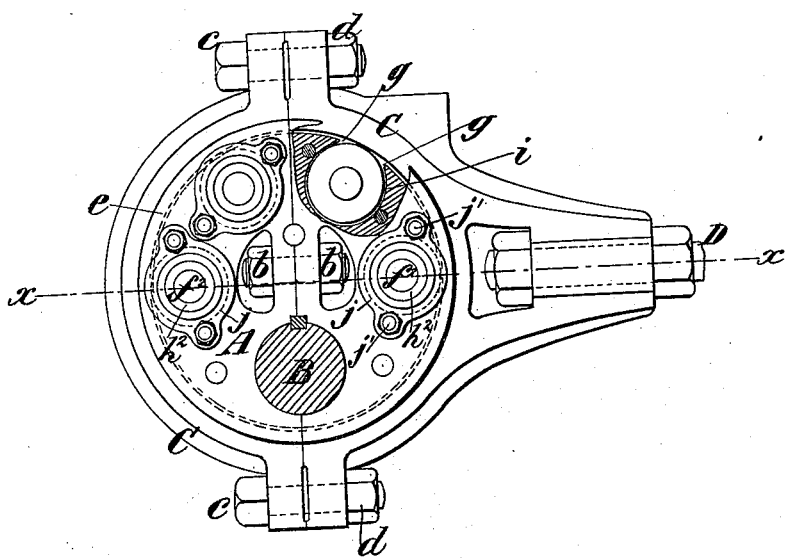
Figure 2:
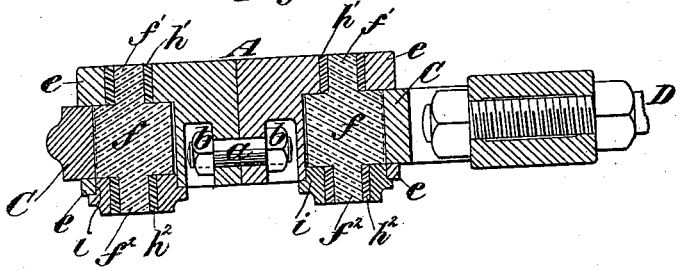

Figure 1 is a side view partly in section of an eccentric embodying my invention. Fig. 2 represents a central section of the same in the line $x\,x$ of Fig. 1.

Similar letters of reference designate corresponding parts in both the figures.

A is the eccentric disk or wheel represented as halved for the purpose of placing it over the shaft B and having the two halves bolted together on the shaft by the screw bolt $a$ and nuts $b$.

C is the hoop or strap divided in the usual way and having its two parts bolted together by screw bolts $c$ and nuts $d$.

The disk or wheel is grooved or flanged in the usual way to receive the strap and confine it laterally but instead of the strap being fitted snugly to the smaller circumferential portion of the disk or wheel within the groove or between the flanges $e$ thereof, it is fitted quite loosely thereto.

The disk or wheel has provided or formed in it at equal or convenient distances apart in a circle concentric with its center, a series of cavities, represented as of circular form, for the reception of a number of antifriction rollers $f$, the said cavities opening as shown at $g\,g$ into that portion of the circumference of the disk or wheel between the flanges $e$. On one side of the disk or wheel the said cavities $i$ are open as shown on the lower side of Fig. 2, for the insertion of the rollers $f$ from that side but on the other side the said cavities are closed except that bores are provided in them for the reception of the journals $f'$ of the rollers and for steel bushings $h'$ in which said journals turn. The open sides of the said cavities are fitted with caps $j$ which contain bushings $h^2$ for the journals $f^2$ of the rollers on the first mentioned side of the disk. These caps are made with flanges or lugs to receive screws $j'$ by which they are secured in place and made to confine the rollers within the disk or wheel. By the removal of the said screws and caps the removal and replacement of the rollers through the side of the wheel or disk are permitted.

The arrangement of the bushing or axle bearings for the rollers is such that the peripheries of the rollers project very slightly beyond the circumferential surface of that part of the disk or wheel which is received in the strap or hoop and that they serve as bearings for the said strap or hoop. The number and spacing of the rollers should be such that the series occupies at least one fourth of the circumference of the wheel or disk from each side of the radial line of the extreme throw of the eccentric, those being the portions of the eccentric which are active in transmitting power and which are subject to friction, and the power being all transmitted from those portions.

What I claim as my invention is—

An eccentric comprising a disk or wheel having cavities which are open both on one side of the said disk or wheel and at the periphery thereof, antifriction rollers arranged within said cavities, removable caps for closing the openings of said cavities on one side of the disk or wheel, and bearings in the sides of said disk or wheel for the journals of said rollers, one of said bearings for each of said rollers being in one of said removable caps, substantially as and for the purpose herein set forth.

JAMES CLAYTON.

Witnesses:
FREDK. HAYNES,
GEORGE BARRY.